United States Patent
Nick et al.

(10) Patent No.: US 11,162,624 B2
(45) Date of Patent: Nov. 2, 2021

(54) SUB-SEA CONNECTOR

(71) Applicant: Parker-Hannifin Corporation, Cleveland, OH (US)

(72) Inventors: Leonard Nick, Rockford, MN (US); Jason Richard Koller, Eden Prairie, MN (US)

(73) Assignee: Parker-Hannifin Corporation, Cleveland, OH (US)

( * ) Notice: Subject to any disclaimer, the term of this patent is extended or adjusted under 35 U.S.C. 154(b) by 98 days.

(21) Appl. No.: 16/474,158

(22) PCT Filed: Jan. 29, 2018

(86) PCT No.: PCT/US2018/015673
§ 371 (c)(1),
(2) Date: Jun. 27, 2019

(87) PCT Pub. No.: WO2018/144372
PCT Pub. Date: Aug. 9, 2018

(65) Prior Publication Data
US 2020/0408344 A1      Dec. 31, 2020

Related U.S. Application Data

(60) Provisional application No. 62/453,165, filed on Feb. 1, 2017.

(51) Int. Cl.
*F16L 5/14* (2006.01)
*F16L 37/56* (2006.01)
(Continued)

(52) U.S. Cl.
CPC ............ *F16L 37/56* (2013.01); *E21B 33/038* (2013.01); *F16L 1/26* (2013.01); *F16L 5/027* (2013.01); *F16L 5/14* (2013.01)

(58) Field of Classification Search
CPC ... F16L 37/56; F16L 1/26; F16L 5/027; F16L 5/14
See application file for complete search history.

(56) References Cited

U.S. PATENT DOCUMENTS

| | | | |
|---|---|---|---|
| 4,709,725 | A | 12/1987 | Morrison |
| 7,172,447 | B2 | 2/2007 | Allensworth et al. |

(Continued)

FOREIGN PATENT DOCUMENTS

| | | | |
|---|---|---|---|
| EP | 2 264 278 A | 12/2010 | |
| GB | 2 408 299 A | 5/2005 | |
| GB | 2 460 927 A | 12/2009 | |

OTHER PUBLICATIONS

PCT/US2018/015673; PCT International Search Report and Written Opinion of the International Searching Authority dated Jul. 6, 2018.

(Continued)

*Primary Examiner* — Matthew Troutman
*Assistant Examiner* — James A Linford
(74) *Attorney, Agent, or Firm* — Renner, Otto, Boisselle & Sklar, LLP

(57) ABSTRACT

A coupler assembly (60) for a sub-sea connector including a coupler (18) having an abutment (76) radially outwardly from the coupler body (64), and a radially inwardly extending groove (78) in the coupler body that is longitudinally spaced apart from the abutment. The abutment (76) is configured to engage the rear side of the plate when the coupler is inserted through a rearward opening in the plate. The groove (78) may be longitudinally spaced apart from the abutment such that, when the abutment is engaged with the rear of the plate, the groove is positioned forwardly of the front side of the plate sufficiently to allow a portion of a mounting ring (82) to be inserted into the groove with a portion of the mounting ring protruding radially outwardly (Continued)

from the body to engage an abutment surface at the front side of the plate, thereby restricting axial movement of the body relative to the plate.

20 Claims, 5 Drawing Sheets

(51) Int. Cl.
*E21B 33/038* (2006.01)
*F16L 1/26* (2006.01)
*F16L 5/02* (2006.01)

(56) References Cited

U.S. PATENT DOCUMENTS

| | | | |
|---|---|---|---|
| 8,398,052 | B2 | 3/2013 | Svensson |
| 8,499,839 | B2 | 8/2013 | Reid et al. |
| 8,991,501 | B2 | 3/2015 | Roberts et al. |
| 2006/0266964 | A1 | 11/2006 | Farley |
| 2009/0315276 | A1* | 12/2009 | Smith, III ............... F16L 1/26 277/641 |
| 2010/0024907 | A1* | 2/2010 | Tibbitts ................. F16L 21/03 137/614.04 |
| 2010/0296891 | A1 | 11/2010 | Tsukamoto |
| 2011/0037249 | A1 | 2/2011 | Smith, III |
| 2011/0101675 | A1 | 5/2011 | Smith, III |
| 2014/0112699 | A1* | 4/2014 | Lewkoski ............... F16L 39/04 403/33 |
| 2016/0273694 | A1 | 9/2016 | Cox et al. |
| 2016/0290063 | A1 | 10/2016 | Richards |

OTHER PUBLICATIONS

PCT/US2018/015673; Second Written Opinion of the International Searching Authority dated Feb. 15, 2019.
PCT/US2018/015673; PCT International Preliminary Report on Patentability of the International Preliminary Examining Authority dated May 20, 2019.

* cited by examiner

SUB-SEA CONNECTOR

RELATED APPLICATIONS

This application is a national phase of International Application No. PCT/US2018/015673 filed Jan. 29, 2018 and published in the English language, which claims the benefit of U.S. Provisional Application No. 62/453,165 filed Feb. 1, 2017, both of which are hereby incorporated herein by reference in their entireties.

FIELD OF INVENTION

The present invention relates generally to a coupler assembly for a connector, and more particularly to a connector having one or more such coupler assemblies, such as for use in sub-sea environments.

BACKGROUND

Connectors known as stabplates may be coupled together to connect high-pressure fluid lines, electrical power lines, or other communication lines, often under severe sub-sea conditions. One half of the sub-sea coupling typically is a fixed stabplate that is attached to base equipment on the control side of the sub-sea system. The other half of the sub-sea coupling is a free stabplate that initially is moveable into position for coupling relative to the fixed stabplate. Each stabplate typically has multiple couplers that are connected to conduits, such as hoses or tubing, which allows the conduits from each stabplate to be simultaneously connected via the couplers in a single operation, rather than requiring the individual connection of each coupler.

During assembly of such stabplates, the couplers may be slidably mounted through a plate from the front side or from the rear side. The couplers are usually fixedly attached to the conduits, for example, with long sections of tubing that are welded directly to a rearward end of the coupler. This tubing often has multiple bends, which makes it difficult to feed the tubing through the plate when the coupler is loaded from the front. In contrast, loading the couplers from the rear side of the stabplate does not typically require the conduits to be fed through the plate, and thus rear-loading of the couplers is desirable since it provides for easier installation compared to front-loaded couplers.

While some rear-loaded coupler designs for stabplates are known, these designs typically require over-insertion of the coupler through the rear of the plate in order to expose a groove in the coupler body that allows insertion of a retention member into the groove toward a front side of the plate. These designs then require repositioning of the coupler rearwardly so that the forward retention member cooperates with other retention members and/or the front side of the plate for restricting further rearward movement relative to the front side of the plate. A rearward retention member is then installed on the coupler body for engaging a rear side of the plate. However, this process of mounting these known rear-mounted coupler designs is time-consuming and frustrating to the installer, especially when multiple couplers and conduits crowd the space behind the plate, which makes it difficult to access and install the rearward retention member on the coupler at the back side of the plate.

SUMMARY OF INVENTION

The present invention provides a coupler assembly for a connector that improves the ease of installing the coupler from the rear side of a plate, such as for a stabplate that may be used in subsea applications.

More particularly, the coupler assembly may include a coupler having an abutment radially outwardly from the coupler body, and a radially inwardly extending groove in the coupler body that is longitudinally spaced apart from the abutment. The abutment may be configured to engage the rear side of the plate when the coupler is inserted through an opening in the rear side of the plate. The groove may be longitudinally spaced apart from the abutment such that, when the abutment is engaged with the rear side of the plate, the groove is positioned forwardly of the front side of the plate sufficiently to allow a radially inward portion of a mounting ring to be inserted into the groove with a radially outward portion of the mounting ring protruding radially outwardly from the body to engage an abutment surface at the front side of the plate, thereby restricting axial movement of the body relative to the plate.

Such configuration(s) of the coupler assembly and/or connector enable the coupler to be installed from the rear side of the plate independent of attaching cap screws, set screws, nuts, or other such retaining features toward the rear of the plate after the coupler has been positioned in the plate. This enables ease of installation of the couplers while minimizing access to the back of the plate from the sides, which is often obstructed and difficult to access.

Embodiments of the coupler assembly and/or connector may include one or more of the following additional features alone or in combination.

For example, the abutment surface at the front side of the plate may be disposed at least partially rearwardly of the groove, and radially outwardly overly at least a portion of the mounting ring for engaging the radially outward portion of the mounting ring and maintaining the mounting ring in the groove.

The abutment surface at the front side of the plate may be a radially inwardly and forwardly facing inclined abutment surface, and the groove may have a radially outwardly and rearwardly facing inclined surface that is spaced apart from the inclined abutment surface to define a gap therebetween that allows insertion of the mounting ring into the groove when the abutment on the coupler body is engaged with the rear side of the plate.

The radially inward portion of the mounting ring may have a forward engagement surface configured to engage the inclined surface of the groove, and the radially outward portion of the mounting ring may have a rearward engagement surface configured to engage the inclined abutment surface at the front side of the plate, such that, when in use, the mounting ring may transmit forces from the coupler body to the abutment surface at the front side of the plate for restricting rearward axial movement of the coupler body relative to the plate.

The groove inclined surface and the thrust washer inclined surface may be configured to cooperate with each other for counterbalancing split vector forces transmitted from the coupler body via the mounting ring when in use.

In some embodiments, the mounting ring may have inclined surfaces, including a radially outwardly and rearwardly facing inclined surface for engaging the corresponding inclined abutment surface at the front side of the plate, and a radially inwardly and forwardly facing inclined surface for engaging the corresponding inclined surface of the groove.

In some embodiments, the mounting ring may have parallel inclined sides that correspond with the inclined surfaces of the thrust washer and the groove, which may enable the mounting ring to be slidably inserted into the gap between the thrust washer and the groove.

The mounting ring may be a split mounting ring, such as a split mounting ring having multiple separate segments, that enables the mounting ring to be installable into the groove, and which has sufficient structural integrity to transmit forces to the abutment surface at the front side of the plate.

The abutment surface at the front side of the plate may be a thrust washer installed on the coupler body that is formed separately from the plate.

The coupler assembly may further include a retaining ring encircling the coupler body. The retaining ring may be disposed at least partially forwardly of the groove, and may radially outwardly overly at least a portion of the mounting ring for facilitating maintaining the mounting ring in the groove.

The retaining ring may engage a radially outward forward portion of the mounting ring opposite the side that engages the abutment surface, which may further secure the mounting ring into the groove.

In some embodiments, the retaining ring may have a radially inwardly and rearwardly facing inclined surface for engaging the mounting ring.

In some embodiments, the mounting ring may have a radially outwardly and forwardly facing inclined surface for engaging the corresponding inclined surface of the retaining ring.

In some embodiments, the retaining ring includes a radially inwardly extending protrusion configured to be disposed within another radial groove in the coupler body for restricting axial movement of the retaining ring relative to the coupler body.

In some embodiments, the coupler assembly further includes a second retaining ring, such as a spiral ring, at least partially disposed in another radial groove in the coupler body, the second retaining ring protruding from the coupler body to restrict axial forward movement of the retaining ring that engages the mounting ring.

In some embodiments, the abutment of the coupler body may be formed as a shoulder that extends radially outwardly from the coupler body, the shoulder having a forwardly facing engagement surface for engaging the rear side of the plate.

In some embodiments, the shoulder is unitary with the coupler body.

Such configuration(s) of the coupler assembly and/or connector may improve the ease of installing the coupler from the rear side of a plate, for example, and the access for installation of such coupler assembly and/or connector design(s) may be made primarily along the axis of the coupler, particularly toward the front of the plate.

For example, the coupler may be secured in place with simple and cost effective retaining member(s) that cooperate with radial groove(s) toward the front side of the plate, and which cooperate with an abutment protruding from the coupler body toward the rear side of the plate.

Such configuration(s) also may enable the mounting ring and/or the retaining ring(s) to be easily insertable into the groove(s).

Such configuration(s) may reduce or eliminate the need for tools for securing the coupler after it has been inserted into the plate, and may enable installation or removal of the coupler without applying too much torque.

The retaining ring(s) may be constructed such that they do not typically have force exerted on them during use of the coupler. The design(s) also may be made in such a way that a simple tool, such as a small pick, may be used in the removal of the retaining ring(s) for removing the coupler from the plate.

Such configuration(s) of the coupler assembly and/or connector also may provide for a more compact design, for example, allowing the couplings to be spaced closer together. This may be advantageous because it may allow for a smaller diameter, thinner cross section, more cost effective, and more maneuverable plate.

According to one aspect of the invention, a connector for connecting to another connector to form a coupling, includes: a plate having a rear side and a front side, and an opening extending through the plate from the rear side to the front side; at least one coupler for mating with at least one corresponding coupler of the other sub-sea connector, the at least one coupler being insertable through the opening from the rear side of the plate, and the coupler having: a body extending along a longitudinal axis; the body having an abutment for engaging the rear side of the plate during insertion of the coupler through the opening in the plate from the rear side of the plate; and a radially inwardly extending groove longitudinally spaced apart from the abutment; and a mounting ring at least partially disposed in the groove and configured to engage an abutment surface at the front side of the plate for restricting rearward movement of the body; and wherein the groove is longitudinally spaced apart from the shoulder such that, when the abutment is engaged with the rear side of the plate, the groove is positioned forwardly of the front side of the plate sufficiently to allow a radially inward portion of the mounting ring to be inserted into the groove with a radially outward portion protruding radially outwardly from the body so as to engage the abutment surface at the front side of the plate for restricting rearward axial movement of the body relative to the plate.

According to another aspect of the invention, a coupler assembly for a connector with a plate includes: a coupler having a body extending between forward and rearward ends along a longitudinal axis, the body having an abutment for engaging the rear side of the plate, and a radially inwardly extending groove longitudinally spaced apart in the forward direction from the abutment; a mounting ring at least partially disposed in the groove; and a thrust washer encircling the coupler body, the thrust washer being disposed at least partially rearwardly of the groove and radially outwardly overlying at least a portion of the groove; wherein the groove and the thrust washer each have a forward surface that is forwardly inclined to a plane which is perpendicular to the longitudinal axis; and wherein the groove inclined surface and the thrust washer inclined surface are spaced apart to define a gap that allows insertion of the mounting ring into the groove.

According to another aspect of the invention. a coupler assembly for a connector with a plate, includes: a coupler having a body for extending through the plate along a longitudinal axis, the body having a radially outwardly extending shoulder that is unitary with the body for engaging the rear side of the plate, and a radially inwardly extending groove longitudinally spaced apart from the shoulder; and a mounting ring having a radially inward portion disposed in the groove, and radially outward portion protruding radially outwardly from the body for engaging an abutment surface at the front side of the plate for restricting axial movement of the body.

According to another aspect of the invention, a method of mounting a coupler in a plate of a connector is provided, wherein the plate has a rear side, a front side, and at least one opening extending through the plate from the rear side to the front side; the coupler having a body extending between forward and rearward ends along a longitudinal axis, the coupler body having an abutment for engaging the rear side of the plate, and a radially inwardly extending groove longitudinally spaced apart from the abutment in the forward direction, the method including: (i) inserting the forward end of the coupler body into the plate opening from the rear side of the plate; (ii) sliding the coupler body forward until the abutment of the coupler body engages the rear side of the plate, whereby a forward surface of the groove is spaced from an abutment surface at the front side of the plate to define a gap; and (iii) inserting the mounting ring through the gap such that a radially inward portion of the mounting ring is disposed in the groove and a radially outward portion of the mounting ring protrudes radially outwardly from the coupler body to engage the abutment surface at the front side of the plate, thereby restricting axial movement of the body relative to the plate.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

DETAILED DESCRIPTION

The principles of the present invention have particular application to connectors for sub-sea applications, also referred to as stabplates, and thus will be described below chiefly in this context. It is also understood, however, that the principles and aspects of the present invention may be applicable to other connectors in other applications where it is desirable to improve the ease of installing one or more couplers through a rear side of a plate of the connector.

Figure 1:
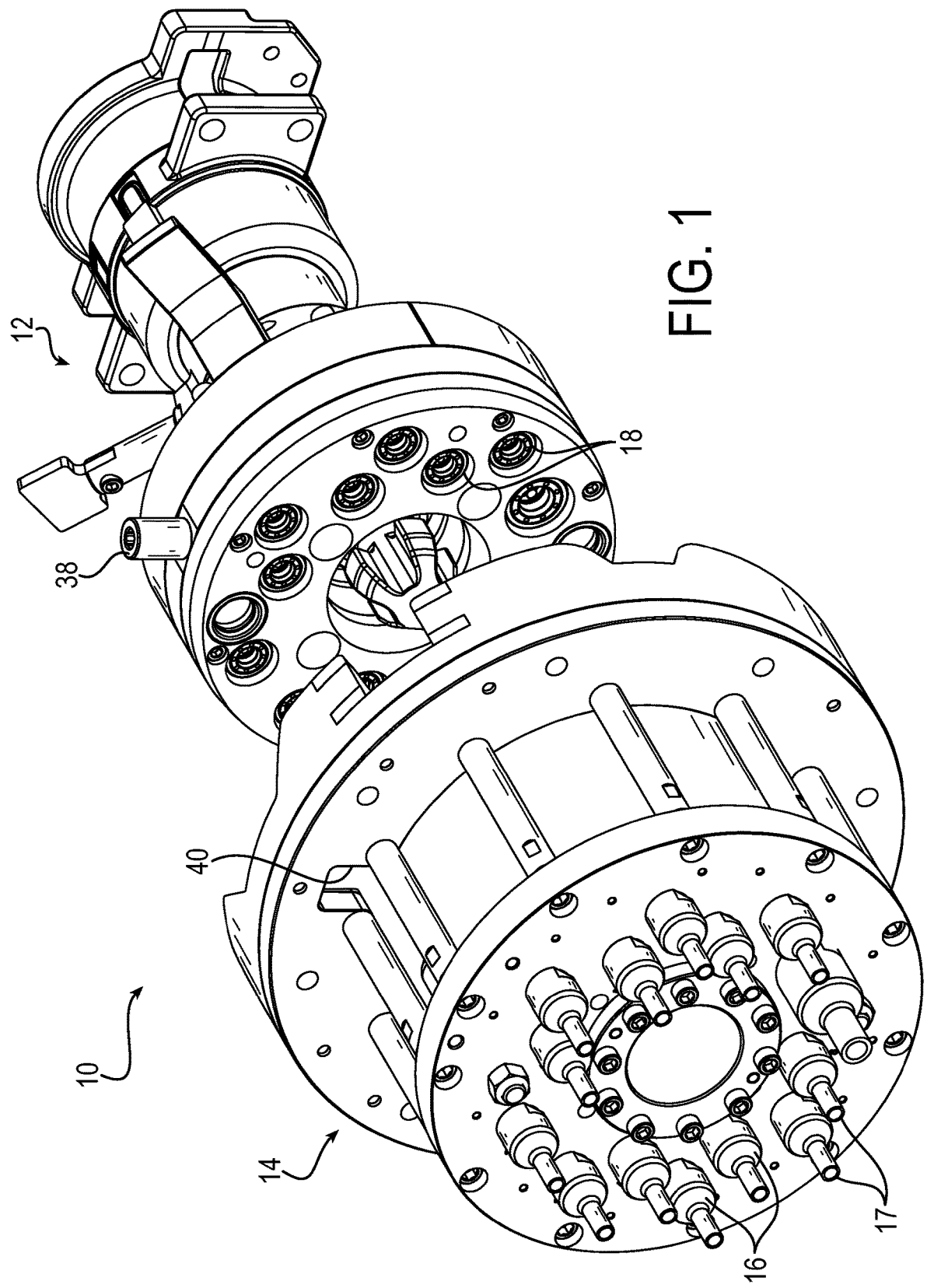
FIG. 1 is a perspective view of an exemplary sub-sea coupling according to an embodiment of the invention, including an exemplary fixed connector and an exemplary free connector.
Figure 2:
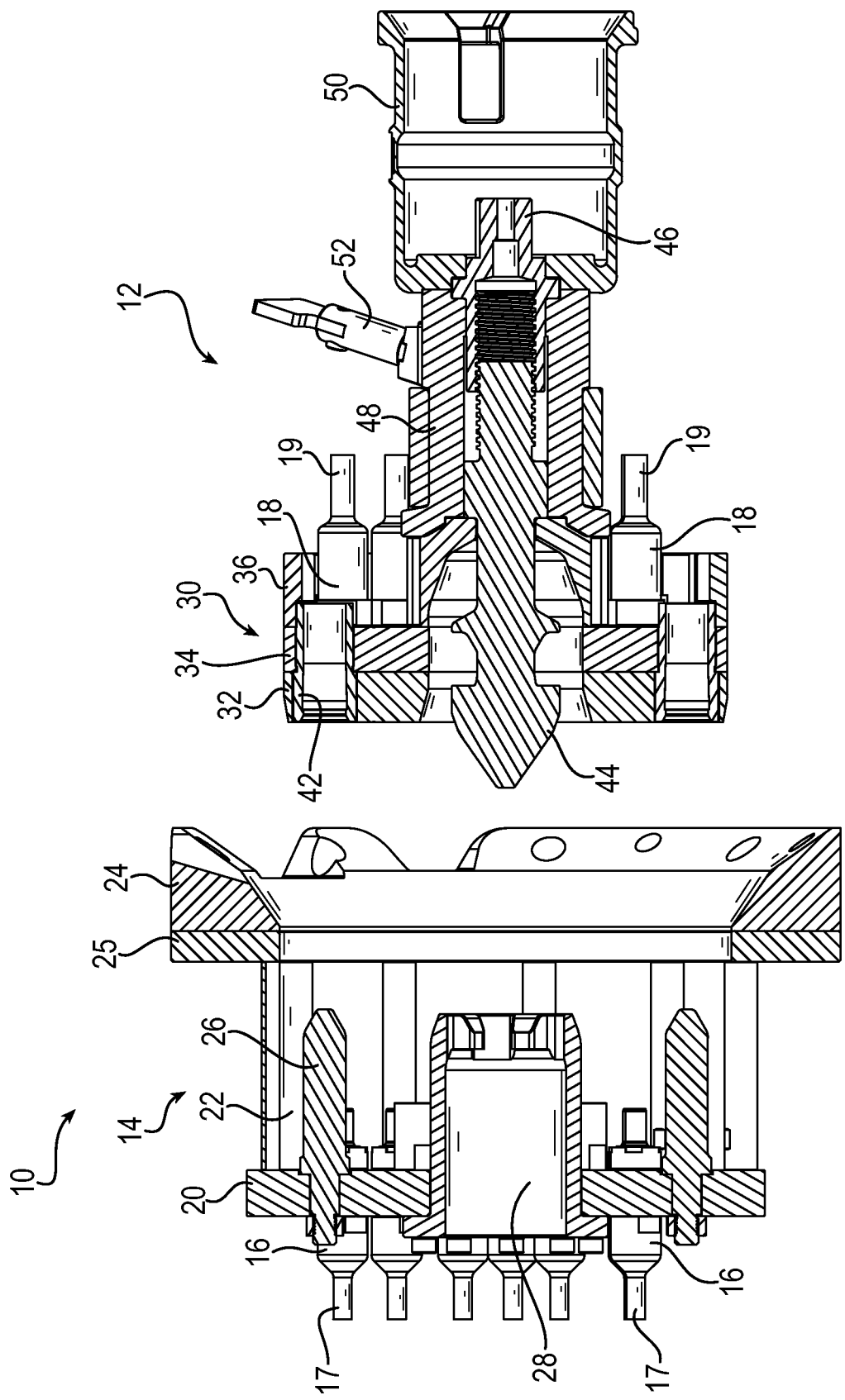
FIG. 2 is a cross-sectional view of the sub-sea coupling in FIG. 1.
Figure 3:
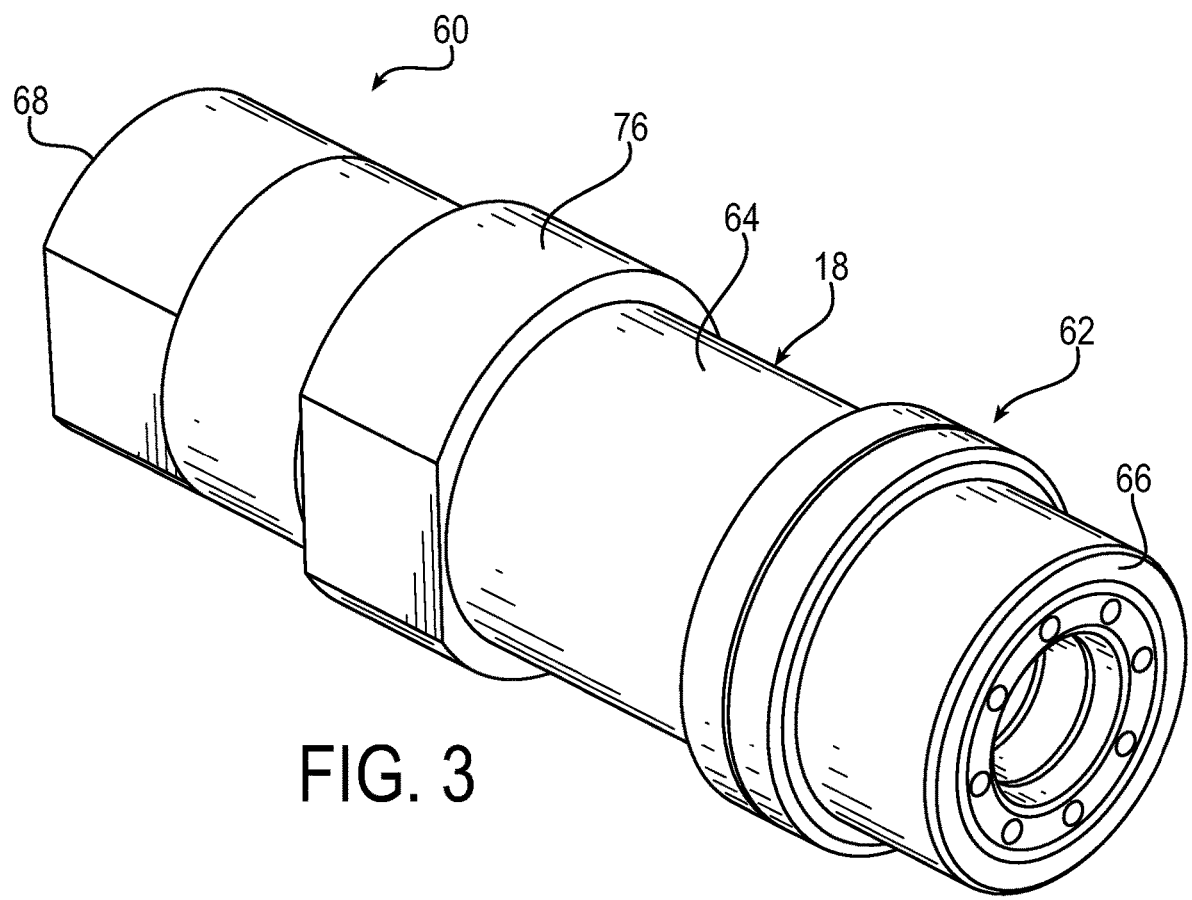
FIG. 3 is a perspective view of an exemplary coupler assembly according to an embodiment of the invention.
Figure 4:
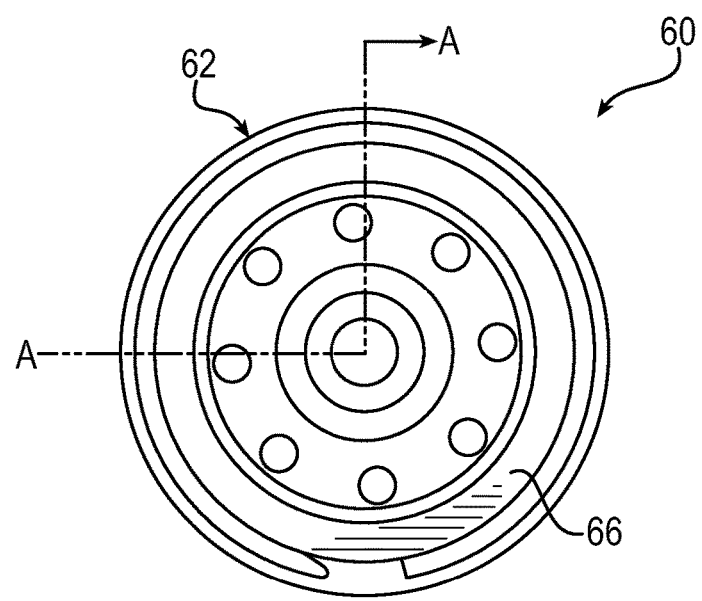
FIG. 4 is an end view of the coupler assembly in FIG. 3.
Figure 5:
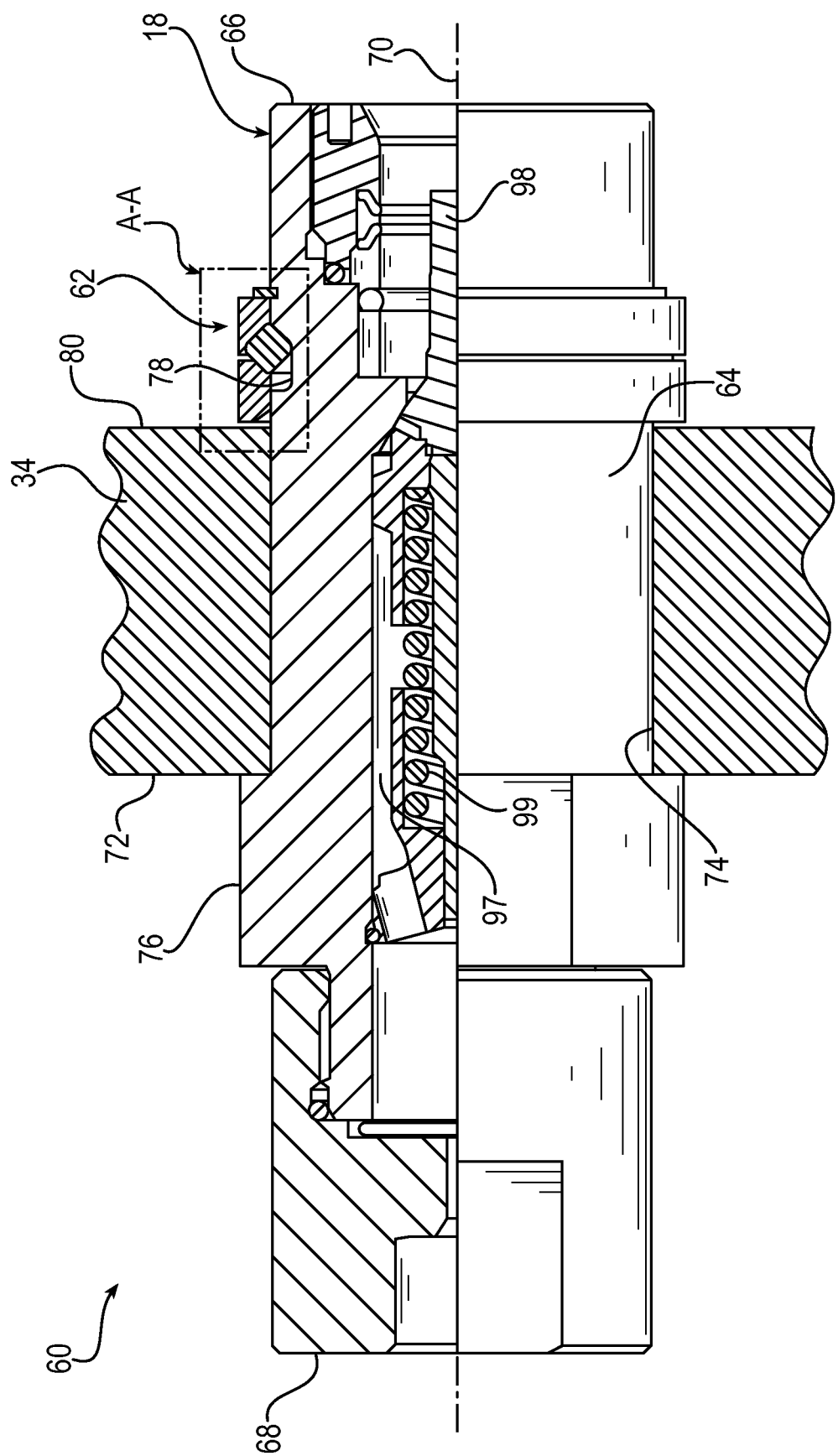
FIG. 5 is a partial cross-sectional view of the coupler assembly in FIG. 3 mounted in a plate.
Figure 6:
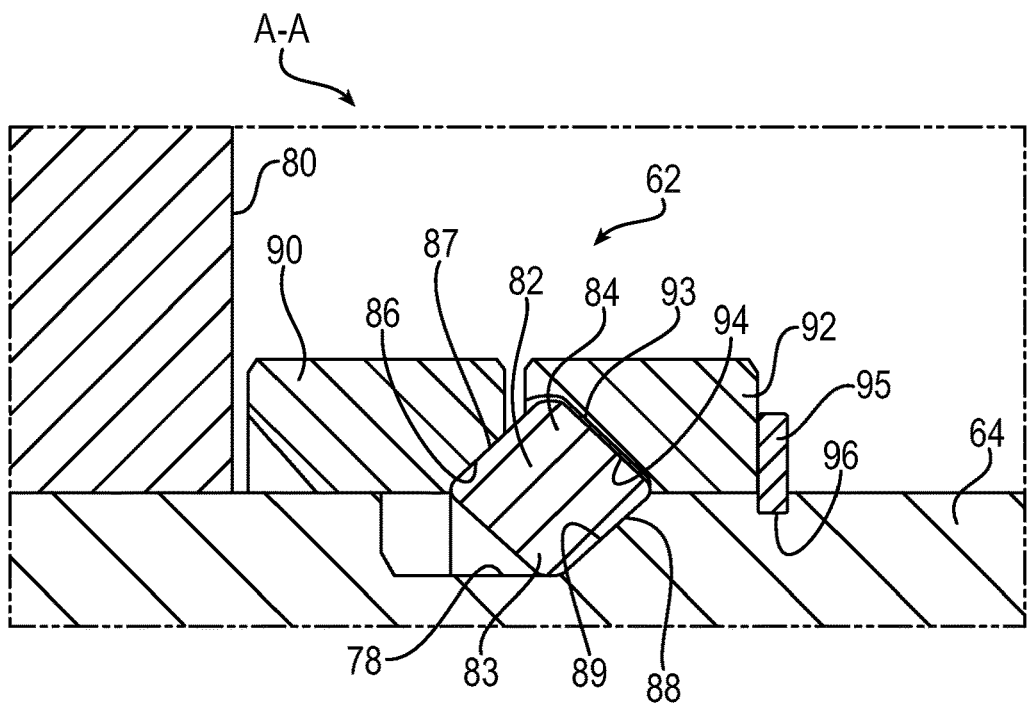
FIG. 6 is an enlarged view of section A-A shown in FIG. 3.

Referring to FIGS. 1 and 2, an exemplary sub-sea coupling 10 is shown. The coupling 10 includes an exemplary free connector 12 and an exemplary fixed connector 14. The fixed connector 14 may be attached to base equipment on a control side of a sub-sea system (not shown), and the free connector 12 initially is moveable into position, such as by remote operated vehicle, for coupling relative to the fixed connector 14. The fixed connector 14 has one or more couplers 16 (e.g., male couplers) that are connected to conduits 17. The free connector 12 also has one or more couplers 18 (e.g., female couplers) that correspond with the couplers 16, and which also are connected to conduits 19. In this manner, the free connector 12 and fixed connector 14 may be coupled together to connect the one or more conduits 17, 19 via the one or more couplers 16, 18 on each side of the coupling 10 so as to communicate fluids, chemicals, electricity, or other communication streams between sub-sea equipment and related control systems, for example.

As shown, the fixed connector 14 is configured to receive the free connector 12 and may include a fixed plate 20, one or more support bars 22, a guide funnel 24 coupled to a mounting ring 25, one or more guide pins 26, and a socket 28. The free connector 12 may include a plate assembly 30, including a protective plate 32, an intermediate plate 34 (also referred to as a free plate 34), and a guide hoop 36. The free plate assembly 30 initially may be received by the guide funnel 24 of the fixed connector 14, and the guide funnel 24 may have a tapering form to assist in guiding the free connector 12 into alignment. The free plate 30 may include an alignment post 38 for being received in a corresponding slot 40 in the fixed connector 14, which may enable primary rotational alignment between the connectors 12, 14. The free plate 34 may include one or more bushings 42 for receiving the one or more guide pins 26 of the fixed connector 14, and for facilitating the guidance of the connectors 12, 14 as they are being connected.

A locking mechanism 44 may extend along an axis through the free plate 30 for being received in the socket 28 of the fixed connector 14. The locking mechanism 44 is rotatable about an axis between a locked position for securing the free connector 12 to the fixed connector 14, and an unlocked position for releasing the free connector 12 from the fixed connector 14. In the illustrated embodiment, the locking mechanism is configured as a bayonet having a head portion configured with a cruciform-shaped cross-section for being received in a correspondingly shaped socket 28. The locking mechanism 44 includes a drive mechanism 46 for rotating the locking mechanism 44 between the locked position and unlocked position. In the illustrated embodiment, the drive mechanism 46 includes a drive nut at an end portion of the locking mechanism 44 that is engageable by the remote operated vehicle, for example.

A housing 48 may be disposed on a rear side of the free plate 30 that is opposite a front side facing the fixed connector 14. The housing 48 may be operatively fixed to the free plate 30 to restrict relative movement between the free plate 30 and the housing 48. As shown, the housing 48 surrounds at least a portion of the locking mechanism 44. A torque receptacle 50 also may be coupled to the housing 48. In addition, a secondary release mechanism 52 may be mounted to the housing 48, and may be utilized for unlocking the connectors 12, 14 in the case where the drive mechanism 46 is seized. It will be appreciated that the overall configuration of the coupling 10 is an example, and other coupling configurations may be used with connection features associated with the present invention. A detailed description of an exemplary coupling comparable to the coupling 10, and suitable for use in the present invention, may be found in U.S. Provisional Application No. 62/413,739 filed Oct. 27, 2016, the entirety of which is incorporated herein by reference.

Referring to FIGS. 3-6, an exemplary coupler assembly 60 is shown that may be employed for fluid connection in a coupling such as the coupling 10. In the illustrated embodiment, the coupler assembly 60 includes coupler 18 and a retention mechanism 62. The coupler 18 has a body 64 that extends between a forward end 66 and a rearward end 68 along a longitudinal axis 70. As shown, the coupler 18 is forwardly insertable from a rear side 72 of plate 34 through an opening 74. As discussed in further detail below, after insertion of the coupler 18 through the plate 34, the retention mechanism 62 is installable on the coupler body 64 toward a front side 80 of the plate to restrict axial movement of the body 64 relative to the plate 34.

The coupler body 64 has an abutment 76 toward its rearward end 68 for engaging the rear side 72 of the plate during insertion of the coupler 18 from the rear of the plate 34. As shown in the illustrated embodiment, the abutment 76 may be a radially outwardly and forwardly facing shoulder configured to engage the rear side 72 of the plate. In exemplary embodiments, the shoulder may be unitary with body 64. It is understood, however, that the abutment 76 may be configured to attach to the body 64 before coupler 18 is inserted through the rear of the plate 34.

The coupler body 64 also has a radially inwardly extending groove 78 that is longitudinally spaced apart in the forward direction from the abutment 76. As shown particularly in the close-up view of FIG. 6, the radially inwardly extending groove 78 may be longitudinally spaced apart from the abutment 76 such that, when the abutment 76 is engaged with the rear side 72 of the plate, the groove 78 is positioned forwardly of the front side 80 of the plate sufficiently to allow a mounting ring 82 to be at least partially inserted into the groove 78. In this manner, the mounting ring 82 may have a radially inward portion 83 for engaging the groove 78, and a radially outward portion 84 protruding radially outwardly from the body 64 for engaging an abutment surface 86 at the front side 80 of the plate. As shown, the radially outward portion 84 of the mounting ring has a rearward engagement surface 87 configured to engage the abutment surface 86, and the radially inward portion 83 of the mounting ring has a forward engagement surface 88 configured to engage a forward surface 89 of the groove. This enables the mounting ring 82 to transmit forces from the coupler body 64 to the abutment surface 86 at the front side of the plate for restricting rearward axial movement of the coupler body 64 relative to the plate 34.

The abutment surface 86 at the front side of the plate may be disposed at least partially rearwardly of the groove 78, and may radially outwardly overly at least a portion of the mounting ring 82 for engaging the radially outward portion 84 of the mounting ring and maintaining the mounting ring in the groove. In exemplary embodiments, the abutment surface 86 may be a radially inwardly and forwardly facing inclined abutment surface, and the forward surface 89 of the groove may be a radially outwardly and rearwardly facing inclined surface that is spaced apart from the inclined abutment surface to define a gap therebetween that allows insertion of the mounting ring 82 into the groove 78.

The respective inclined surfaces 86, 88 also may enable forces exerted by the coupler 18 to be split into vector forces, which limits the axial component of force tending to push the coupler body 64 out of the plate 34. Such forces exerted by the coupler 18 may be in response to separation forces exerted against couplers 16, 18 under high-pressure loads, such as may be caused by fluid pressure in the respective couplers 16, 18, for example. In exemplary embodiments, the groove inclined surface 88 and the inclined abutment surface 86 may be parallel to each other. This may allow for counterbalancing of the split vector forces transmitted from the coupler body 64 via the mounting ring 82 when the coupler is in use, for example, during separation of the couplers 16, 18 under load. In the illustrated embodiment, the groove inclined surface 88 and the inclined abutment surface 86 are each inclined at 45-degrees relative to a plane that is perpendicular to the longitudinal axis 70 of the coupler 18. Such a configuration of the inclined surfaces 86, 88 may enable the vector forces reacting through the inclined surfaces 86, 88 to be split into equal components of axial and transverse load.

The mounting ring 82 may be a split mounting ring, such as a split mounting ring having multiple separate segments, which facilitates inserting the mounting ring 82 into the groove 78. The mounting ring 82 should maintain sufficient structural integrity to transmit forces from the coupler body 64 to the abutment surface 86 at the front side of the plate. In this manner, the mounting ring 82 may be made of metal, but also could be made of other suitable materials, which may be selected in a well-known manner as understood by those having ordinary skill in the art.

In exemplary embodiments, the mounting ring 82 may have inclined surfaces that correspond with engagement surfaces in the groove and abutment surface(s) at the front side of the plate. For example, the radially inward forward engagement surface 88 of the mounting ring may be a radially inwardly and forwardly facing inclined surface for engaging the corresponding groove inclined surface 89, and the radially outward rearward engagement surface 87 may be a radially outwardly and rearwardly facing inclined surface for engaging the corresponding inclined abutment surface 86 at the front side of the plate. In some embodiments, the inclined surfaces 87, 88 of the mounting ring may be parallel to each other to cooperate with parallel inclined surfaces 86, 89 of the abutment surface and the groove. Such configurations of the mounting ring 82 also may facilitate slidably inserting the mounting ring 82 into the gap between the abutment surface 86 and the groove engagement surface 89. In the illustrated embodiment, the mounting ring 82 has a generally diamond-shaped cross-section with sufficient thickness between sides that allows insertion between abutment surface 86 and groove surface 89, and which also facilitates engagement at a radially outward forward portion with a separate retaining ring, as discussed in further detail below. It is understood, however, that the mounting ring 82 may be provided in other configurations having cross-sections such as square, rectangular, circular, oval, polygonal, or other such cross-sectional configurations. For example, the mounting ring 82 may have a circular cross-section with a sufficient diameter that enables insertion between, and engagement with, the abutment surface 86 and the groove surface 89 so as to transmit forces from the coupler body 64 to the front side of the plate 34.

In the illustrated embodiment, the abutment surface 86 at the front side of the plate is formed by a thrust washer 90 installed on the coupler body 64, which is formed separately from the plate 34. As shown, the thrust washer 90 encircles the coupler body 64 and may be installed at least partially rearwardly of the groove, which may occur after inserting the coupler body 64 in the plate 34 and before inserting the mounting ring 82 into the groove 78. As discussed above, forces exerted from the coupler body 64 may be transmitted via the mounting ring 82 to the abutment surface 86 to restrict axial movement of the coupler body 64 relative to the plate 34 during use. In this manner, the thrust washer 90 should have sufficient structural integrity to withstand these forces. As such, the thrust washer 90 may be made of metal, but also could be made of other suitable rigid materials. It is understood that although the abutment surface 86 is shown as being formed by the thrust washer 90 that is separate from the plate 34, the abutment surface 86 at the front side of the plate may be provided in other configurations. For example, the abutment surface 86 may be integral with the plate 34, such as a recess or chamfer in the front side 80 of the plate.

The coupler assembly 60 may further include a retaining ring 92. The retaining ring 92 may be installed at least partially forwardly of the groove 78, which may occur after inserting the mounting ring 82 into the groove 78. The retaining ring 92 may radially outwardly overlie and engage a radially outward forward engagement surface 93 of the mounting ring 82 for facilitating maintaining the mounting ring 82 in the groove. In exemplary embodiments, the retaining ring 92 may have a radially inwardly and rearwardly facing inclined surface 94 for engaging the radially outward forward surface 93 of the mounting ring 82. As shown, the radially outward forward surface 93 of the mounting ring may be a radially outwardly and forwardly facing inclined surface for engaging the corresponding retaining ring inclined surface 94.

In the illustrated embodiment, the coupler assembly 60 further includes another retaining ring 95 for cooperating with the retaining ring 92. The retaining ring 95 may be at least partially disposed in another radial groove 96 in the coupler body, such that a radially outward portion of the retaining ring 95 protrudes radially outwardly from the coupler body 64 to engage and restrict axial forward movement of the retaining ring 92. In exemplary embodiments, the retaining ring 95 is a split spiral ring, which is easily installable and removable from the groove 96. The retaining rings 92, 95 may be configured such that they do not typically have force applied to them during separation or use of the coupler 18 in the field, and thus may be made from relatively light-weight and/or inexpensive materials, such as plastic, or from other suitable materials, such as metal.

The exemplary coupler assembly 60 and/or connector 12 enables the coupler 18 to be mounted from the rear side 72 of the plate 34, which eases and improves the assembly of the connector 12. An exemplary method of assembly may thus include the steps of: (1) inserting the forward end 66 of the coupler body 64 into the plate opening 74 from the rear side 72 of the plate 34; (2) sliding the coupler body 64 forward until the abutment 76 on the coupler body 64 engages the rear side 72 of the plate, whereby the forward surface 89 of the groove 78 is spaced from the abutment surface 86 at the front side 80 of the plate to define a gap; and (3) inserting the mounting ring 82 through the gap such that a radially inward portion 83 of the mounting ring 82 is disposed in the groove 78, and a radially outward portion 84 of the mounting ring 82 protrudes radially outwardly from the coupler body 64 to engage the abutment surface 86 at the front side of the plate, thereby restricting axial movement of the coupler body 64 relative to the plate 34.

In exemplary embodiments, where the abutment surface 86 at the front side of the plate is defined by the thrust washer 90 formed separately from the plate 34, then an additional step of the exemplary method may include installing the thrust washer 90 on the coupler body 64 at least partially rearwardly of the groove 78, which may occur after inserting the coupler body 64 through the rear side 72 of the plate and before inserting the mounting ring 82 in the groove 78. As discussed above, the abutment surface 86 may radially overly at least a portion of the groove 78, and the thrust washer 90 may be positioned such that the space between the abutment surface 86 and the groove surface 88 form a gap that allows insertion of the mounting ring 82. In addition, after inserting the mounting ring 82, the exemplary method may further include a step of installing the retaining ring 92 on the coupler body 64 at least partially forwardly of the groove 78 to radially outwardly overly at least a portion of the mounting ring 82 for facilitating maintaining the mounting ring 82 in the groove. In exemplary embodiments, the second retaining ring 95 then may be inserted into the second groove 96 to restrict axial movement of the retaining ring 92.

In the embodiment shown in FIGS. 3-6, the exemplary coupler assembly 60 is shown with coupler 18 (e.g., female coupler) disposed in free plate 34 of connector 12, which may couple at a forward end portion thereof with a corresponding coupler 16 (e.g., male coupler) in fixed plate 20 of connector 14 to form coupling 10. It is understood, however, that the exemplary coupler assembly also may be used with couplers and/or connectors other than female couplers and/or free plates. For example, the exemplary coupler assembly may be used to install female couplers in fixed plates, male couplers in free plates, male couplers in fixed plates, and the like. The exemplary coupler assembly may use quick couplers, such as that shown in the illustrated embodiment, or other couplers may be utilized. In the illustrated embodiment, the coupler 18 is a fluid coupler for communicating fluid through conduit 19 (shown in FIGS. 1 and 2), wherein the fluid coupler has a fluid passage 97 and a valve member 98 biased by a spring 99. It is understood, however, that the coupler may be another type of coupler, for example, a coupler that could provide electrical, chemical, or other communication when coupled to a corresponding coupler of the opposite connector.

Figure 7:
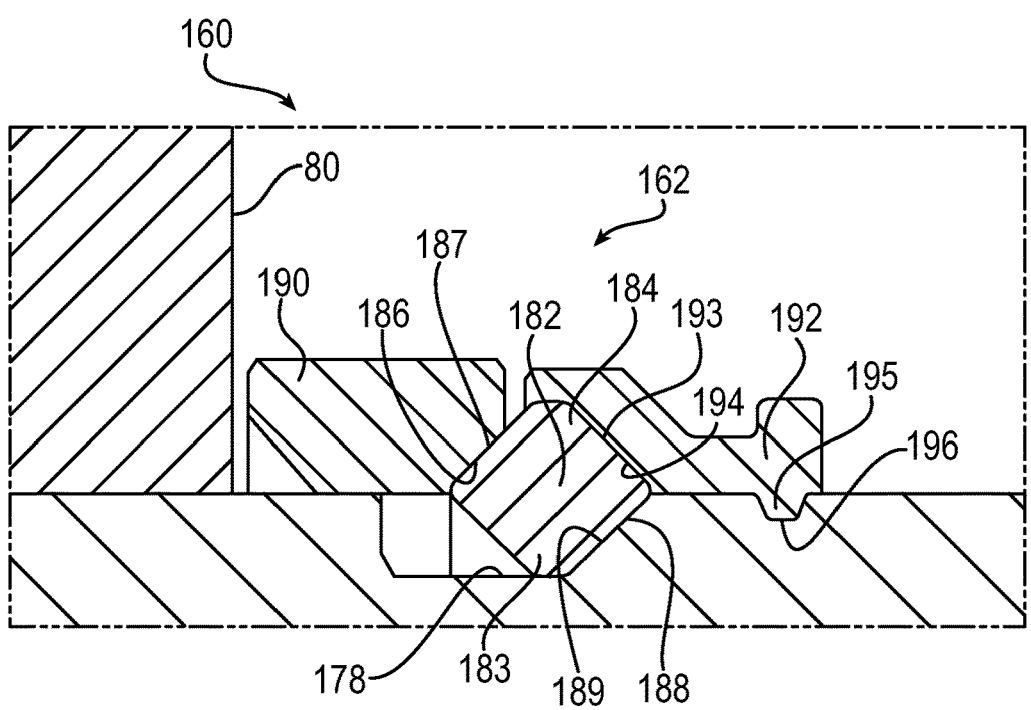
FIG. 7 is an enlarged view of a portion of another exemplary coupler assembly according to another embodiment of the invention.

Turning now to FIG. 7, an enlarged view of a portion of another exemplary embodiment of a coupler assembly 160 for a connector is shown. The coupler assembly 160 has comparable features to the above-referenced coupler assembly 60, and consequently the same reference numerals but indexed by 100 are used to denote structures corresponding to the same or similar structures in the coupler assemblies. In addition, the foregoing description of the coupler assembly 60 is equally applicable to the coupler assembly 160 except as noted below. Moreover, it is understood that aspects of the coupler assemblies 60, 160 and/or corresponding connectors may be substituted for one another or used in conjunction with one another where compatible. It is furthermore understood that although the entirety of the coupler assembly 160 is not shown, those structures not shown may be substantially similar to, or the same as, the corresponding structures of the coupler assembly 60.

As shown in the illustrated embodiment, the coupler assembly 160 is substantially similar to the coupler assembly 60, except that the retaining ring 192 has a radially inwardly extending protrusion 195 configured to be disposed within the radial groove 196 in the coupler body 164 for restricting axial movement of the retaining ring 192 relative to the coupler body 164. In this manner, the retaining ring 95 of the coupler assembly 60 (shown in FIGS. 3-6) is optionally omitted from the illustrated embodiment in FIGS. 7 and 8. It is understood, however, that such a retaining ring 95 could be included in the coupler assembly 160, such as being disposed in another radial groove to further secure the retaining ring 192 in place.

It is also understood that an exemplary method of installing the coupler assembly 160 may essentially be the same as the aforementioned method of installing the coupler assembly 60, except that instead of installing the retaining ring 95 into the groove 96, the radially inward protrusion 195 of retaining ring 192 may be snapped into the groove 196 to restrict axial movement of the retaining ring 192 when it is installed on the coupler body 164. In this manner, when the retaining ring 192 is installed on the coupler body at least partially forwardly of the groove 178, the radially inward engagement surface 194 of the retaining ring 192 may engage the radially outward forward engagement surface 193 of the mounting ring 182 for facilitating maintaining the mounting ring 182 in the groove.

As discussed above, the retaining ring 192 may be configured such that it does not typically have force applied to it during separation or use of the coupler 18 in the field. In this manner, the retaining ring 192 may be made from relatively light-weight and/or inexpensive materials, such as plastic. In exemplary embodiments, the retaining ring 192 may be configured such that after the radially inward protrusion 195 has been snapped into the groove 196, it is not easily removable, so that cutting through and/or otherwise destroying the retaining ring 192 is how the retaining ring 192 would be removed. Such a configuration of the retaining ring 192 would therefore act as evidence of tampering with the coupler, in that the absence of the retaining ring is indicative of intentional removal by cutting. Alternatively, the retaining ring 192 may be configured with an axial slit that enables the retaining ring 192 to be easily removed and reinstalled.

It is understood that although the coupler assembly 160 is shown with coupler 118 (e.g., female quick disconnect fluid coupler) disposed in free plate 34 of connector 12, the coupler assembly 160 also may be used with couplers and/or connectors other than female fluid couplers and/or free plates. For example, the coupler assembly 160 may be used to install female couplers in fixed plates, male couplers in free plates, male couplers in fixed plates, and the like; or also may be used to provide fluid, electrical, chemical, or other communication when coupled to a corresponding coupler.

An exemplary coupler assembly for a sub-sea connector has been described herein. The coupler assembly includes a coupler having an abutment radially outwardly from the coupler body, and a radially inwardly extending groove in the coupler body that is longitudinally spaced apart from the abutment. The abutment may be configured to engage the rear side of the plate when the coupler is inserted through a rearward opening in the plate. The groove may be longitudinally spaced apart from the abutment such that, when the abutment is engaged with the rear of the plate, the groove is positioned forwardly of the front side of the plate sufficiently to allow a portion of a mounting ring to be inserted into the groove with a portion of the mounting ring protruding radially outwardly from the body to engage an abutment surface at the front side of the plate, thereby restricting axial movement of the body relative to the plate.

Such configuration(s) of the coupler assembly and/or connector may minimize the number of assembly steps, particularly at the back of the plate, and may thereby ease coupler installation difficulties and save assembly time.

For example, such coupler assembly and/or connector design(s) may be installable into the plate independent of attaching cap screws, set screws, nuts, or other such retaining features toward the rear of the plate after the coupler has been positioned in the plate. This enables ease of installation of the couplers while minimizing access to the back of the plate from the sides, which is often obstructed and difficult to access.

For example, the access for installation of such coupler assembly and/or connector design(s) may be made primarily along the axis of the coupler, particularly toward the front of the plate.

Such configuration(s) may enable the coupler to be secured in place with simple and cost effective retaining member(s) that cooperate with radial groove(s) toward the front side of the plate, and which cooperate with an abutment protruding from the coupler body toward the rear side of the plate.

Such configuration(s) may reduce or eliminate the need for tools for securing the coupler after it has been inserted into the plate, and may enable installation or removal of the coupler without applying too much torque.

The coupler assembly may include at least one mounting ring and/or retaining ring that is easily insertable into the groove(s). In addition, the radial groove for receiving the mounting ring may be a relatively simple design, for example, being devoid of threads or other complicated geometry that is difficult to machine.

The mounting ring may be a metal-based split mounting ring, which may be formed of multiple separate segments. The mounting ring may have two split mounting ring segments for ease of assembly, however, more than two mounting segments could be used.

The mounting ring may have parallel sides for respectively engaging the groove and the abutment surface at the front of the plate. This may facilitate installation, may allow insertion of the mounting ring into the groove while providing minimal axial float tolerance of the coupler relative to the plate, and may also assist in splitting vector forces to minimize axial load.

The retaining ring(s) may be constructed such that they do not typically have force exerted on them during use of the coupler. The design(s) also may be made in such a way that a simple tool, such as a small pick, may be used in the removal of the retaining ring(s) for removing the coupler from the plate.

For example, exemplary designs may have the retention mechanism secured in place with a simple and cost effective single wound retaining ring, such as a metal-based spiral ring, that snaps into a groove.

Alternatively or additionally, exemplary designs may be secured in place with a simple and cost effective retaining ring, such as a plastic retaining component, that replaces the spiral retaining ring. Such a retaining component may have a radially inward protrusion configured to snap into a groove of the coupler body, instead of using the spiral retaining ring.

The coupler assembly may have certain components that are symmetrical so as to prevent these components from being installed backwards. For example, the thrust washer and mounting ring may be made symmetrical. It is understood, however, that these components may be asymmetrical instead.

Such configuration(s) of the coupler assembly and/or connector also provides for a more compact design. This may be advantageous because it allows the couplings to be spaced closer together, which may allow for a smaller diameter, thinner cross section, more cost effective, and more maneuverable plate.

In some embodiments, such design(s) also may be employed without a recess machined into the plate, which may provide a simpler and more cost-effective plate.

The components of the coupler assembly and/or connector may be made of any suitable materials, such as corrosion resistance metals, metals with corrosion resistant coatings, plastics, or the like, which may be selected in a well-known manner to accommodate the forces, temperatures, fluid types, external environments, and other factors associated with affecting the functionality of the coupler assembly and/or connector.

It is understood that in the discussion above, the terms such as "forward," "rearward," "front," "rear," "top", "bottom," "end," "inner," etc. refer to an arbitrary frame of reference of the exemplary coupler and/or connector as viewed FIG. 1, rather than to the ordinary gravitational frame of reference. This is done realizing that these units, when in use, can be mounted on the top, bottom, or sides of other components, or can be provided in various other positions.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A coupler assembly for mounting in an opening in a plate of a sub-sea connector, the plate having a rear side and a front side, the coupler assembly comprising:
   a coupler body extending between forward and rearward ends along a longitudinal axis,
   the forward end of the coupler body being configured to fluidly couple with another coupler,
   the rearward end of the coupler body being configured to connect to a fluid conduit,
   the coupler body having an abutment monolithically formed with the coupler body, the abutment having a radially outwardly protruding and forwardly facing engagement surface that faces toward the forward end of the coupler body and is configured to engage the rear side of the plate, and
   the coupler body having a circumferential groove longitudinally spaced apart in the forward direction from the forwardly facing engagement surface of the abutment such that the circumferential groove is located between the forwardly facing engagement surface and the forward end of the coupler body;
   a mounting ring configured at least partially insertable in the circumferential groove; and
   a thrust washer configured mountable on the coupler body to at least partially secure the mounting ring in the circumferential groove;
   wherein the coupler body is configured and so dimensioned as to be forwardly insertable through the opening in the plate from the rear side of the plate so that the forward end of the coupler corresponds with the front side of the plate and the rearward end of the coupler corresponds with the rear side of the plate,
   wherein the abutment is configured and so dimensioned as to be engageable with the rear side of the plate to prevent further forward movement of the coupler body relative to the plate,
   wherein a longitudinal spacing between the forwardly facing engagement surface of the abutment and the circumferential groove is so dimensioned that with the forwardly facing engagement surface of the abutment engaging the rear side of the plate the circumferential groove is positioned forwardly of the front side of the plate in order that the thrust washer and the mounting ring are cooperative to securely mount the thrust washer on the coupler body and securely insert the mounting ring in the circumferential groove to enable constraining axial movement of the coupler body relative to the plate, and wherein the coupler is a fluid coupler comprising a fluid passage and a valve member movable in the fluid passage, the fluid passage opening through the forward end of the coupler body, and a forward end of the valve member being located closer to the forward end of the coupler body than the rearward end of the coupler body.

2. The coupler assembly according to claim 1, wherein the thrust washer and the mounting ring are respectively configured and so dimensioned that with the thrust washer mounted on the coupler body between the front side of the plate and the circumferential groove the mounting ring is securely insertable in the circumferential groove.

3. The coupler assembly according to claim 2, wherein the thrust washer has a forward surface configured to engage a rearward surface of the mounting ring, wherein the circumferential groove has a forward surface configured to engage a forward surface of the mounting ring, and
   wherein the thrust washer and circumferential groove are respectively configured and so dimensioned that with the thrust washer mounted on the coupler body between the front side of the plate and the circumferential groove a gap is formed between the forward surface of the thrust washer and the forward surface of the circumferential groove in which the gap is configured to enable insertion of the mounting ring into the circumferential groove via the gap.

4. The coupler assembly according to claim 2, wherein the thrust washer has a rearward surface configured to engage the front side of the plate, the thrust washer being configured and so dimensioned to mount to the coupler body in a region between the circumferential groove and the front side of the plate (i) to sandwich a portion of the plate between the thrust washer and the forwardly facing engagement surface of the abutment, and (ii) to cooperate with the mounting ring to enable constraining axial movement of the coupler body relative to the plate.

5. The coupler assembly according to claim 1, wherein the abutment is formed from a radially protruding shoulder of the coupler body in which the forwardly facing engagement surface is a vertical surface that is perpendicular to the longitudinal axis of the coupler body.

6. The coupler assembly according to claim 1, wherein the coupler body, the thrust washer, and the mounting ring are each configured to cooperate with each other such that:
   (i) the coupler body is insertable through the rear side of the plate; and
   (ii) with the forwardly facing engagement surface of the abutment engaging the rear side of the plate, the mounting ring and thrust washer are mountable on the coupler body: (a) without requiring further forward movement of the coupler body relative to the plate, and (b) in a way that prevents rearward movement of the coupler body relative to the plate.

7. A coupler assembly for mounting in an opening in a plate of a sub-sea connector, the plate having a rear side and a front side, the coupler assembly comprising:
   a coupler body extending between forward and rearward ends along a longitudinal axis,
   the forward end of the coupler body being configured to fluidly couple with another coupler,
   the rearward end of the coupler body being configured to connect to a fluid conduit,
   the coupler body having an abutment with a radially outwardly protruding and forwardly facing engagement surface configured to engage the rear side of the plate, and
   the coupler body having a circumferential groove longitudinally spaced apart in the forward direction from the forwardly facing engagement surface of the abutment;
   a mounting ring configured at least partially insertable in the circumferential groove; and
   a thrust washer configured mountable on the coupler body to at least partially secure the mounting ring in the circumferential groove;
   wherein the coupler body is configured and so dimensioned as to be forwardly insertable through the opening in the plate from the rear side of the plate so that the forward end of the coupler corresponds with the front side of the plate and the rearward end of the coupler corresponds with the rear side of the plate,
   wherein the abutment is configured and so dimensioned as to be engageable with the rear side of the plate to prevent further forward movement of the coupler body relative to the plate, and
   wherein a longitudinal spacing between the forwardly facing engagement surface of the abutment and the circumferential groove is so dimensioned that with the forwardly facing engagement surface of the abutment engaging the rear side of the plate the circumferential groove is positioned forwardly of the front side of the plate in order that the thrust washer and the mounting ring are cooperative to securely mount the thrust washer on the coupler body and securely insert the mounting ring in the circumferential groove to enable constraining axial movement of the coupler body relative to the plate,
   the coupler assembly further comprising a retaining ring configured and so dimensioned as to be mountable on the coupler body forwardly of the circumferential groove to at least partially secure the mounting ring in the circumferential groove.

8. The coupler assembly according to claim 7,
   wherein the retaining ring has a radially inwardly and rearwardly facing inclined surface configured to radially outwardly overlie and engage a complimentary inclined surface of the mounting ring.

9. The coupler assembly according to claim 7,
   wherein the coupler is a fluid coupler comprising a fluid passage and a valve member movable in the fluid passage, the fluid passage opening through the forward end of the coupler body, and a forward end of the valve member being located closer to the forward end of the coupler body than the rearward end of the coupler body.

10. The coupler assembly according to claim 7,
   wherein the thrust washer has a forward surface configured to engage a rearward surface of the mounting ring,
   wherein the circumferential groove has a forward surface configured to engage a forward surface of the mounting ring,
   wherein the thrust washer and circumferential groove are respectively configured and so dimensioned that with the thrust washer mounted on the coupler body between the front side of the plate and the circumferential groove a gap is formed between the forward surface of the thrust washer and the forward surface of the circumferential groove in which the gap is configured to enable insertion of the mounting ring into the circumferential groove via the gap,
   wherein the forward surface of the thrust washer is a forwardly and radially inwardly facing inclined surface; and wherein the forward surface of the circumferential groove is a rearwardly and radially outwardly facing inclined surface.

11. The coupler assembly according to claim 7, wherein the abutment is monolithically formed with the coupler body to provide a radially outwardly protruding shoulder of the coupler body having the forwardly facing engagement surface.

12. A coupler assembly for mounting in an opening in a plate of a sub-sea connector, the plate having a rear side and a front side, the coupler assembly comprising:
   a coupler body extending between forward and rearward ends along a longitudinal axis,
   the forward end of the coupler body being configured to fluidly couple with another coupler,
   the rearward end of the coupler body being configured to connect to a fluid conduit,
   the coupler body having an abutment with a radially outwardly protruding and forwardly facing engagement surface configured to engage the rear side of the plate, and
   the coupler body having a circumferential groove longitudinally spaced apart in the forward direction from the forwardly facing engagement surface of the abutment;
   a mounting ring configured at least partially insertable in the circumferential groove; and
   a thrust washer configured mountable on the coupler body to at least partially secure the mounting ring in the circumferential groove;
   wherein the coupler body is configured and so dimensioned as to be forwardly insertable through the opening in the plate from the rear side of the plate so that the forward end of the coupler corresponds with the front side of the plate and the rearward end of the coupler corresponds with the rear side of the plate,
   wherein the abutment is configured and so dimensioned as to be engageable with the rear side of the plate to prevent further forward movement of the coupler body relative to the plate,
   wherein a longitudinal spacing between the forwardly facing engagement surface of the abutment and the circumferential groove is so dimensioned that with the forwardly facing engagement surface of the abutment engaging the rear side of the plate the circumferential groove is positioned forwardly of the front side of the plate in order that the thrust washer and the mounting ring are cooperative to securely mount the thrust washer on the coupler body and securely insert the mounting ring in the circumferential groove to enable constraining axial movement of the coupler body relative to the plate,
   wherein the thrust washer has a forward surface configured to engage a rearward surface of the mounting ring,
   wherein the circumferential groove has a forward surface configured to engage a forward surface of the mounting ring, wherein the thrust washer and circumferential groove are respectively configured and so dimensioned that with the thrust washer mounted on the coupler body between the front side of the plate and the circumferential groove a gap is formed between the forward surface of the thrust washer and the forward surface of the circumferential groove in which the gap is configured to enable insertion of the mounting ring into the circumferential groove via the gap, wherein the forward surface of the thrust washer is a forwardly and radially inwardly facing inclined surface; and wherein the forward surface of the circumferential groove is a rearwardly and radially outwardly facing inclined surface.

13. The coupler assembly according to claim 12,
wherein the forwardly and radially inwardly facing inclined surface of the thrust washer is configured to be parallel to the rearwardly and radially outwardly facing inclined surface of the circumferential groove to counterbalance split vector forces transmitted from the coupler body via the mounting ring when in use.

14. The coupler assembly according to claim 13,
wherein the forwardly and radially inwardly facing inclined surface of the thrust washer and the rearwardly and radially outwardly facing inclined surface of the circumferential groove are each configured to be inclined at 45-degrees relative to the plane that is perpendicular to the longitudinal axis of the coupler body.

15. The coupler assembly according to claim 12,
wherein the mounting ring has opposite inclined surfaces that respectively are complimentary to the forwardly and radially inwardly facing inclined surface of the thrust washer and the rearwardly and radially outwardly facing inclined surface of the circumferential groove.

16. The coupler assembly according to claim 12, wherein the coupler assembly further includes a retaining ring configured and so dimensioned as to be mountable on the coupler body forwardly of the circumferential groove to at least partially secure the mounting ring in the circumferential groove.

17. The coupler assembly according to claim 12, wherein the abutment is monolithically formed with the coupler body to provide a radially outwardly protruding shoulder of the coupler body having the forwardly facing engagement surface.

18. A sub-sea connector, comprising:
a plate, and
the coupler assembly according to claim 1 mounted in the plate.

19. A sub-sea connector, comprising:
a plate, and
the coupler assembly according to claim 7 mounted in the plate.

20. A sub-sea connector, comprising:
a plate, and
the coupler assembly according to claim 12 mounted in the plate.

* * * * *